United States Patent
Buckley

(10) Patent No.: US 7,010,171 B2
(45) Date of Patent: Mar. 7, 2006

(54) IMAGE QUALITY PROCESSING OF A COMPRESSED IMAGE

(75) Inventor: Robert R. Buckley, Rochester, NY (US)

(73) Assignee: Xerox Corporation, Stamford, CT (US)

(*) Notice: Subject to any disclaimer, the term of this patent is extended or adjusted under 35 U.S.C. 154(b) by 687 days.

(21) Appl. No.: 09/919,085

(22) Filed: Jul. 31, 2001

(65) Prior Publication Data

US 2003/0026489 A1    Feb. 6, 2003

(51) Int. Cl.
G06K 9/36    (2006.01)

(52) U.S. Cl. .................................. 382/243; 382/235

(58) Field of Classification Search ............... 382/233, 382/235, 243; 358/1.15, 1.2
See application file for complete search history.

(56) References Cited

U.S. PATENT DOCUMENTS 5,884,014 A * 3/1999 Huttenlocher et al. ...... 358/1.15

* cited by examiner

Primary Examiner—Duy M. Dang
(74) Attorney, Agent, or Firm—Fay, Sharpe, Fagan, Minnich & McKee, LLP

(57) ABSTRACT

An imaging apparatus receives a stream of image data compressed according to a token based compression algorithm. The token dictionary is decompressed and processed according to desired standards such as optimizing for a particular image output device. After revision, the revised tokens are stored in a revised dictionary which is accessed upon decompression of image content. When the image content is decompressed the locations in the compressed or coded input data stream refer to locations in the revised dictionary which are extracted and output either to hard copy or for further processing.

17 Claims, 2 Drawing Sheets

IMAGE QUALITY PROCESSING OF A COMPRESSED IMAGE

BACKGROUND OF THE INVENTION

The present invention relates to the digital image processing arts. It finds particular application in conjunction with processing text symbols in a token based compression system, and will be described with particular reference thereto. However, it is to be appreciated that the invention is applicable to image output processing of any token based or symbol dependent compression technique.

Typically image output data streams or bitmaps are optimized for particular printers or output devices. However, it is known that not all print engines respond identically even when driven by the same bitmap. The result is that a black and white image on printer A will look somewhat different than the same image produced by printer B. Technology has been developed that receives a bitmapped representation of an entire image or page, recognizes it was produced or generated for a particular printer, and converts or optimizes the bitmap for output on another printer. Typical conversions include morphological operations such as thickening or thinning lines and the like. Unfortunately, when compressed files are routed, the image is typically entirely decompressed, then processed as needed for optimization on a particular output device.

The present invention contemplates a new method and apparatus to process compressed digital image data which overcomes the above-referenced problems and other.

SUMMARY OF THE INVENTION

In accordance with one embodiment of the present invention, a method of processing compressed digital image data includes receiving the digital image data compressed according to a defined pattern matching technique, such as JBIG2. The digital image data includes coded image content data and a decoding pattern dictionary which contains image patterns substituted for the coded image content data upon decompression. The image patterns in the decoding pattern dictionary are then either revised and output on the fly, or revised and replaced in the dictionary to be used later in decompressing digital image data. Moreover, the received image patterns in the decoding pattern dictionary may be either compressed or uncompressed.

In accordance with another aspect of the present invention, the method further includes replacing the revised image patterns in the dictionary.

In accordance with another aspect of the present invention, the method further includes decoding or decompressing the coded image content data with the revised image patterns in the dictionary.

In accordance with another aspect of the present invention, the decoding includes parsing the coded image content data, and extracting from the data a pattern location corresponding to a location in the dictionary. The processed image pattern at the extracted location is then output.

In accordance with another aspect of the present invention, the processing includes converting the image patterns to grayscale.

In accordance with another aspect of the present invention, the processing includes morphological operations on the image pattern in the decoding pattern dictionary.

In accordance with another embodiment of the present invention, in an image processing system which receives image data compressed by a pattern matching process, a method of decompressing the image data includes adjusting at least one pattern in a database of stored post-compression patterns where the adjusting is responsive to characteristics of a desired output mechanism or operation. An input pattern location is received corresponding to the adjusted post-compression pattern in the database and the adjusted post-compression pattern is then extracted from the database.

In accordance with another aspect of the present invention, the adjusting includes image processing a plurality of post-compression patterns received with the image data such as morphological processing or grayscale processing.

In accordance with another aspect of the present invention, the adjusting includes image processing a first instance of each input pattern location received, for example during real-time decompression operations.

In accordance with another embodiment of the present invention, a method of manipulating a data stream in a xerographic image output device includes receiving the data stream including an output pattern dictionary and a coded portion referencing identifiable patterns in the output pattern dictionary. Image processing is applied to an output pattern in the dictionary and the output pattern is replaced with the image processed output pattern.

In accordance with another aspect of the present invention, an image processed output pattern corresponding to a symbol location in the data stream is output.

In accordance with another aspect of the present invention, the image processing includes adjusting the output pattern for a particular image output device.

One advantage of the present invention resides in consistently processed image output tokens for each instance of a designated compressed token.

Another advantage of the present invention resides in reduced image output processing times.

Other benefits and advantages will occur to others skilled in the art upon a reading and understanding of the following detailed description.

BRIEF DESCRIPTION OF THE DRAWINGS

The invention may take form in components and various arrangements of components, and in various steps and arrangements of steps. The drawings are only for purposes of illustrating the preferred embodiments, and are not to be construed as limiting the invention.

DETAILED DESCRIPTION OF THE PREFERRED EMBODIMENTS

Figure 1:
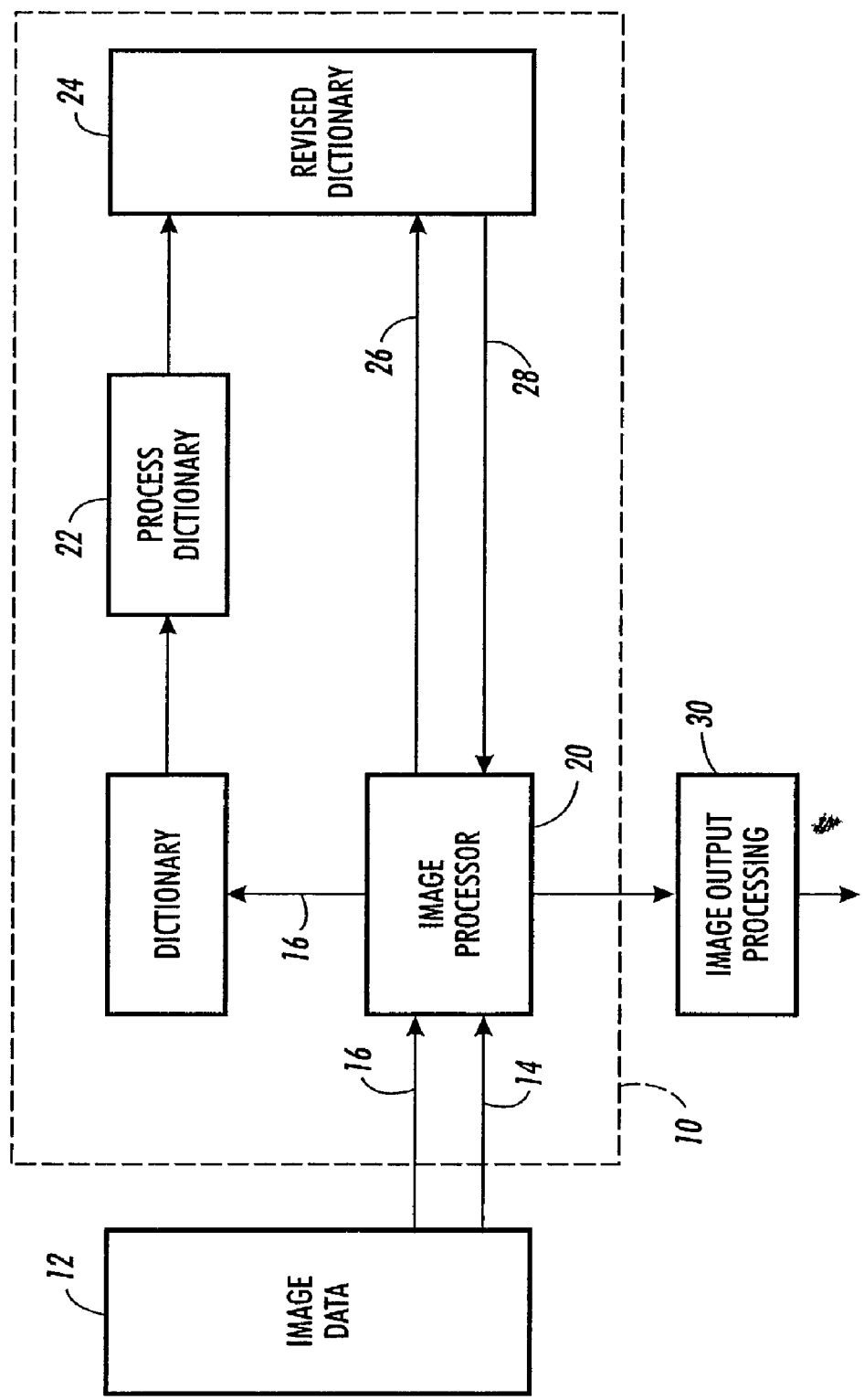
FIG. 1 is a schematic block diagram of the system suitable to practice an aspect of the present invention.

With reference now to FIG. 1, an imaging apparatus 10 such as an image output device, printer, server and the like, receives a stream of image data 12. The data is preferably compressed according to a token or pattern matching process such as JBIG2 or other compression techniques which store single copies of patterns in a document. Those skilled in the art, however, will appreciate that the teachings here are equally applicable to other pattern-based substitution processes. Included in the stream of image data 12 are coded image content data 14 or representations and a decoding pattern dictionary 16 or database. The coded image content data 14 carries a token identifier that points to or represents a particular token in the dictionary 16. The dictionary 16 contains image patterns substitutable for the coded image content data 14 upon output processing. For example, a document may be compressed by storing only a single electronic representation of the letter "a." The coded image content data 14 includes an identifier instead of an entire bitmap representation anywhere the letter exists in the document. The identifier indicates a location in the decoding pattern dictionary 16 containing a single stored instance of an output-ready representation of the letter. Those skilled in the art will appreciate that in addition to text patterns for individual letters, similarly groups of characters also repeat frequently enough to usefully contribute to compression schemes. Likewise, other repeating image characteristics compressed by a token or pattern matching process will benefit from the teachings of the present invention.

A decompression processor 20 within the apparatus 10 receives the image data 12. In one embodiment, the processor 20 first identifies and decompresses only the decoding pattern dictionary 16. Because the decoding pattern dictionary 16 ideally includes only single instances of tokens or patterns, it will typically be smaller than the coded image content data 14. A dictionary image processor 22 revises or performs image output processing on individual image patterns in the decoding pattern dictionary 16. The revision includes conventional image quality improvements, anti-aliasing, morphological operations such as edge enhancement, dilation, erosion and others that are readily implemented by those skilled in the art. Alternatively, the revision processing includes selective gray-scaling, color matching, font substitution and other image processing which tends to be output device specific. In the illustrated embodiment of the invention, the apparatus 10 replaces substantially all of the original image patterns in the decoding pattern dictionary 16 with their respective revised image patterns before the coded content 14 is decoded.

With continued reference to FIG. 1, to produce a hard copy output of the compressed digital image, the apparatus 10 then decompresses or decodes the coded image content data 14. The coded image content data 14 is parsed and a token identification corresponding to a location in the decoding pattern dictionary 16 is extracted. The decompression processor 20 then enters a revised dictionary 24 with the location 26 and returns with the revised image pattern 28 to be output or otherwise further rendered 30.

Figure 2:
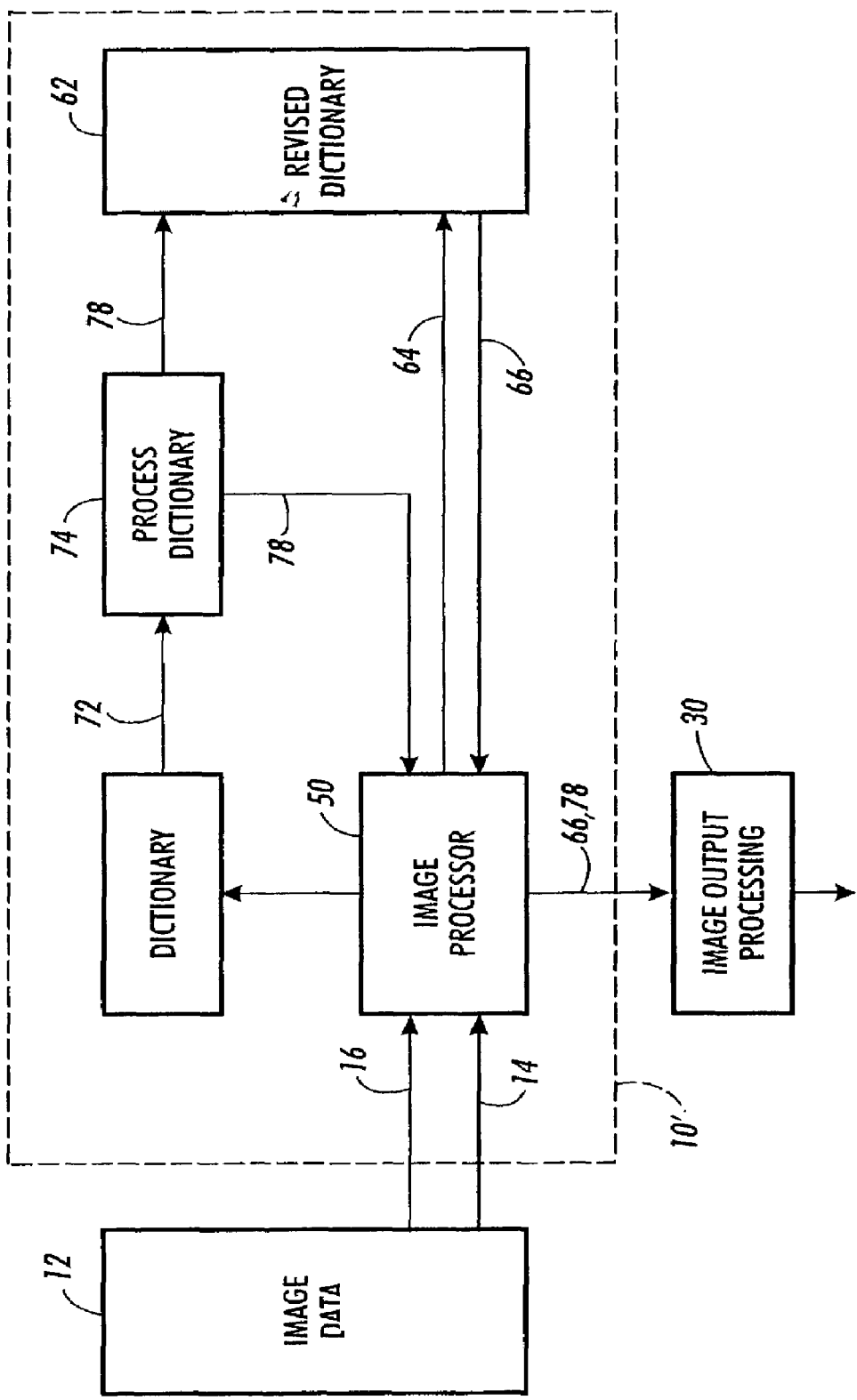
FIG. 2 is a block diagram of a system suitable to practice another aspect of the present invention.

With reference now to FIG. 2, an alternate embodiment processes the image data 12 substantially coincident with its reception. An imaging apparatus 10' receives the stream of image data 12 comprising coded image content data 14 and a decoding pattern dictionary 16. The coded image data 14 is received sequentially by image processor 50, and if the dictionary pattern at the address indicated by the image content data 14 has previously been revised or processed, the processor 50 dips into the revised dictionary 62 at location 64 identified by the coded image data 14 and extracts the corresponding revised symbol 66. The revised symbol 66 is then provided for further image output processing 30 such as rendering or other pre-output image processing techniques.

With continued reference to FIG. 2, in the event the coded image content data 14 refers to a previously unrevised dictionary address, processor 50 extracts the original symbol or token 72 from the original dictionary. The original symbol 72 is then processed 74 or revised in order to be optimized with a particular output device or other desired processing as disclosed herein. The revised symbol 78 is then provided both to the revised dictionary 62 and the decompression processor 50. The decompression processor 50 outputs the revised token 78 for processing 30. Those skilled in the art will appreciate that the two dictionaries, i.e. original dictionary 16 and revised dictionary 62, employed in the discussion and figure are for clarity only. Equal functionality and increased efficiency may be had by replacing original patterns with revised patterns in the same dictionary.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus set forth the preferred embodiments, the invention is now claimed to be:

1. A method of processing compressed digital image data comprising:
   receiving the digital image data compressed according to a defined pattern matching technique, where the digital image data includes coded image content data and a decoding pattern dictionary containing one or more image patterns substitutable for the coded image content data; and
   revising at least one of the one or more image patterns already in the decoding pattern dictionary.

2. The method of processing compressed digital image data as set forth in claim 1, where the image patterns in the decoding pattern dictionary are compressed, the method further comprising prior to the revising step:
   decompressing an image pattern in the decoding pattern dictionary.

3. The method of processing compressed digital image data as set forth in claim 2, further comprising after the revising step:
   compressing the revised image pattern.

4. The method of processing compressed digital image data as set forth in claim 1, further comprising:
   replacing the image pattern in the decoding pattern dictionary with the revised image pattern.

5. The method of processing compressed digital image data as set forth in claim 1, further comprising:
   decompressing the compressed coded image content data using the revised patterns in the decoding pattern dictionary.

6. The method of processing compressed digital image data as set forth in claim 5, where the decompressing comprises:
   parsing the coded image content data;
   extracting from the coded image content data a pattern location corresponding to a location in the decoding pattern dictionary;
   outputting the revised image pattern at the extracted location corresponding to the pattern location.

7. The method of processing compressed digital image data as set forth in claim 1, where the image pattern comprises a binary value, the revising comprising:
   converting the binary image patterns to grayscale.

8. The method of processing compressed digital image data as set forth in claim 1, where the revising comprises:
   applying morphological operations to an image pattern in the decoding pattern dictionary.

9. In an image processing system which receives image data compressed by a pattern matching process, a method of decompressing the image data comprising in optional sequence:
   adjusting an output appearance of at least one pattern in a database of stored post-compression patterns, the adjusting responsive to characteristics of a desired output mechanism;

receiving an input pattern location corresponding to a post-compression pattern in the database; and extracting the adjusted post-compression pattern from the database.

10. The method of decompressing image data as set forth in claim 9, where the adjusting comprises image processing a plurality of the stored post-compression patterns received with the image data prior to receiving an input pattern.

11. The method of decompressing image data as set forth in claim 10, where the adjusting comprises gray scaling a post-compression pattern received with the image data.

12. The method of decompressing image data as set forth in claim 9, where the adjusting comprises image processing a first instance of each input pattern location received.

13. The method of decompressing image data as set forth in claim 12, further comprising replacing the stored post-compression pattern corresponding to the image processed instance, with the image processed instance.

14. A method of manipulating a data stream representation of an image which has been compressed, said method comprising:

receiving the data stream including a dictionary and a coded portion, said dictionary including one or more separate identifiable patterns in the image and said coded portion referencing the identifiable patterns in the dictionary;

image processing a particular pattern in the dictionary; and replacing the particular pattern in the dictionary with the image processed version of that particular pattern.

15. The method of manipulating a data stream representation of an image as set forth in claim 14, further comprising:

outputting a replaced pattern in the dictionary identified by the coded portion of the received data stream.

16. The method of manipulating a data stream representation of an image as set forth in claim 14 where the image processing adjusts the output pattern for a specific image output device.

17. In a xerographic image processing device, a method of manipulating a data stream representation of an image, said method comprising:

receiving the data stream including an output pattern dictionary and a coded portion referencing identifiable patterns in the output pattern dictionary;

image processing a pattern in the output pattern dictionary;

replacing the pattern in the output pattern dictionary with the image processed pattern;

repeating the image processing and replacing steps for all patterns in the output pattern dictionary; and storing the image processed output dictionary on a print server.

* * * * *